US009589252B2

(12) United States Patent
Copes et al.

(10) Patent No.: US 9,589,252 B2
(45) Date of Patent: Mar. 7, 2017

(54) RULE-BASED ARCHIVAL MAINTENANCE

(71) Applicant: BANK OF AMERICA CORPORATION, Charlotte, NC (US)

(72) Inventors: Deborah A. Copes, Wethersfield, CT (US); Deborah N. Bennett, Conyers, GA (US); Timmy L. Gauvin, Peachtree City, GA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 875 days.

(21) Appl. No.: 13/886,540

(22) Filed: May 3, 2013

(65) Prior Publication Data

US 2014/0330789 A1 Nov. 6, 2014

(51) Int. Cl.

| G06F 7/00 | (2006.01) |
|---|---|
| G06F 17/00 | (2006.01) |
| G06Q 10/10 | (2012.01) |
| G06Q 10/06 | (2012.01) |
| G06Q 40/02 | (2012.01) |
| G06F 17/30 | (2006.01) |

(52) U.S. Cl.
CPC ............ *G06Q 10/10* (2013.01); *G06Q 10/06* (2013.01); *G06Q 40/02* (2013.01); *G06F 17/3051* (2013.01)

(58) Field of Classification Search
None
See application file for complete search history.

(56) References Cited

U.S. PATENT DOCUMENTS

| 5,761,663 | A | * | 6/1998 | Lagarde | ............ | G06F 17/30893 |
|---|---|---|---|---|---|---|
| | | | | | | 707/714 |
| 8,019,679 | B2 | * | 9/2011 | Bennett | .................. | G06Q 20/10 |
| | | | | | | 705/37 |
| 2003/0028426 | A1 | * | 2/2003 | Banerjee | ................ | G06Q 30/02 |
| | | | | | | 705/14.37 |
| 2006/0149796 | A1 | * | 7/2006 | Aalmink | ........... | G06F 17/30575 |
| 2008/0052536 | A1 | * | 2/2008 | Shimizu | ........... | G11B 20/00086 |
| | | | | | | 713/193 |
| 2011/0007076 | A1 | * | 1/2011 | Nielsen | ............. | G06F 17/30241 |
| | | | | | | 345/441 |
| 2011/0099602 | A1 | * | 4/2011 | Apparao | ................ | G06Q 10/06 |
| | | | | | | 726/1 |

\* cited by examiner

*Primary Examiner* — Jau-Shya Meng
(74) *Attorney, Agent, or Firm* — Michael A. Springs; Moore & Van Allen PLLC; Nicholas C. Russell (57) ABSTRACT

The invention relates to systems, methods, and computer program products for rule-based maintenance of an archive. A system is provided that includes: a computing platform including a processor and a storage device, a database comprising rules relating to maintenance of information stored in an archive, a software module stored in the storage device comprising executable instructions that when executed by the processor cause the processor to: (a) receive information related to at least one event; (b) compare the information related to the at least one event to the rules relating to maintenance of information stored in the archive; and (c) determine whether to update information stored in an archive based at least partially on the comparison of the information related to the at least one event and the rules relating to maintenance of information stored in the archive.

18 Claims, 4 Drawing Sheets

RULE-BASED ARCHIVAL MAINTENANCE

FIELD

In general, embodiments of the invention relate to systems for information management in an archive. More specifically, embodiments of the invention relate to systems for information management in an archive related to the occurrence of categorical events.

BACKGROUND

Today, many financial institutions are required by federal and some state regulations to maintain image file records of all deposited checks, other negotiable instruments, and generally various financial documents related to customer accounts. In many instances, because of regulations, financial institutions are required to maintain this information for up to seven years and more, in certain situations. Currently, in the domestic market, tens of billions of dollars in checks are processed each year. The result of such a high volume of check processing by banks and other financial institutions is that very large amounts of storage space is required for properly maintaining image file records, as necessitated by regulations. The maintenance and storage of such a large volume of information may prove to be challenging. As such, there is a need to provide systems, apparatus, computer-implemented methods, and computer program products that enable financial institutions to properly and efficiently maintain the check images and other financial information in the archives, in accordance with regulations and with consideration of the needs of their customers.

BRIEF SUMMARY

The following presents a simplified summary of several embodiments of the invention in order to provide a basic understanding of such embodiments. This summary is not an extensive overview of all contemplated embodiments of the invention, and is intended to neither identify key or critical elements of all embodiments, nor delineate the scope of any or all embodiments. Its purpose is to present some concepts of one or more embodiments in a simplified form as a prelude to the more detailed description that is presented later.

Some embodiments of the present invention provide a system that includes: a computing platform including at least one processor and a storage device, a database comprising one or more rules relating to maintenance of information stored in an archive, a software module stored in the storage device comprising executable instructions that when executed by the processor cause the processor to: (a) receive information related to at least one event; (b) compare the information related to the at least one event to the one or more rules relating to maintenance of information stored in the archive; and (c) determine whether to update information stored in an archive based at least partially on the comparison of the information related to the at least one event and the one or more rules relating to maintenance of information stored in the archive.

In some embodiments of the system, the information related to the at least one event relates to an occurrence of an event external to the entity maintaining the archive, and wherein the event external to the entity is associated with a customer of the entity.

In some embodiments of the system, the information related to the at least one event relates to an occurrence of an event internal to the entity maintaining the archive, and where the event internal to the entity is associated with a division of the entity.

In some embodiments of the system, the information related to the at least one event relates to an initiation or an occurrence of litigation, wherein the initiation or the occurrence of litigation involves the customer of the entity.

In some embodiments of the system, wherein the information related to the at least one event relates to a change in regulations governing a time requirement for storing financial information in the archives for customers of a financial institution.

In some embodiments of the system, the software module further comprises executable instructions that when executed by the processor cause the processor to: automatically update a status corresponding to information in the archive, wherein the update changes a prior date for purging the information from the archives to a new date for purging the information from the archive.

In some embodiments of the system, the software module further comprises executable instructions that when executed by the processor cause the process to: (a) determine information stored in the archive that is associated with the at least one event; (b) aggregate the information stored in the archive that is associated with the at least one event; and (c) transfer the information into one or more new files, where the one or more new files are specifically designated for information associated with the at least one event.

In one aspect of the invention, a computer-implemented method is provided for rule-based maintenance of an archive. The computer-implemented method includes using a computer processor to execute computer program code instructions stored in one or more non-transitory computer-readable mediums, wherein said computer program code instructions are structured to cause said computer processor to: (a) receive information related to at least one event; (b) compare the information related to the at least one event to the one or more rules relating to maintenance of information stored in the archive; and (c) determine whether to update information stored in an archive based at least partially on the comparison of the information related to the at least one event and the one or more rules relating to maintenance of information stored in the archive.

In some embodiments of the computer-implemented method, the information related to the at least one event relates to an occurrence of an event external to the entity maintaining the archive, and wherein the event external to the entity is associated with a customer of the entity.

In some embodiments of the computer-implemented method, the information related to the at least one event relates to an occurrence of an event internal to the entity maintaining the archive, and where the event internal to the entity is associated with a division of the entity.

In some embodiments of the computer-implemented method, the information related to the at least one event relates to an initiation or an occurrence of litigation, wherein the initiation or the occurrence of litigation involves the customer of the entity.

In some embodiments of the computer-implemented method, wherein the information related to the at least one event relates to a change in regulations governing a time requirement for storing financial information in the archives for customers of a financial institution.

In some embodiments the computer-implemented method further comprising computer-code instructions that are structured to cause a computer processor to automatically update a status corresponding to information in the archive, wherein the update changes a prior date for purging the information from the archives to a new date for purging the information from the archive.

In some embodiments the computer-implemented method further comprising computer-code instructions that are structured to cause a computer processor to: (a) determine information stored in the archive that is associated with the at least one event; (b) aggregate the information stored in the archive that is associated with the at least one event; and (c) transfer the information into one or more new files, where the one or more new files are specifically designated for information associated with the at least one event.

In another aspect, a computer program product for providing rule-based maintenance of an archive that includes a non-transitory computer-readable medium, wherein the non-transitory computer-readable medium comprises one or more computer-executable program code portions that, when executed by a computer, cause the computer to: (a) receive information related to at least one event; (b) compare the information related to the at least one event to the one or more rules relating to maintenance of information stored in the archive; and (c) determine whether to update information stored in an archive based at least partially on the comparison of the information related to the at least one event and the one or more rules relating to maintenance of information stored in the archive.

In some embodiments of the computer program product, the information related to the at least one event relates to an occurrence of an event external to the entity maintaining the archive, and wherein the event external to the entity is associated with a customer of the entity.

In some embodiments of the computer program product, the information related to the at least one event relates to an occurrence of an event internal to the entity maintaining the archive, and where the event internal to the entity is associated with a division of the entity.

In some embodiments of the computer program product, the information related to the at least one event relates to an initiation or an occurrence of litigation, wherein the initiation or the occurrence of litigation involves the customer of the entity.

In some embodiments of the computer program product, wherein the information related to the at least one event relates to a change in regulations governing a time requirement for storing financial information in the archives for customers of a financial institution In some embodiments the computer program product further comprising computer-readable code that when executed by a computer processor causes the computer to automatically update a status corresponding to information in the archive, wherein the update changes a prior date for purging the information from the archives to a new date for purging the information from the archive.

In some embodiments the computer program product further comprising computer-readable code that when executed by a computer processor causes the computer to: (a) determine information stored in the archive that is associated with the at least one event; (b) aggregate the information stored in the archive that is associated with the at least one event; and (c) transfer the information into one or more new files, where the one or more new files are specifically designated for information associated with the at least one event.

Other aspects and features, as recited by the claims, will become apparent to those skilled in the art upon review of the following non-limited detailed description of the invention in conjunction with the accompanying figures. Additionally, one or more of the steps of the methods described herein may be executed via a processor, such as by a computer processing device.

BRIEF DESCRIPTION OF THE DRAWINGS

Having thus described embodiments of the invention in general terms, reference will now be made to the accompanying drawings, wherein:

FIG. 1 is a flowchart illustrating

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Present embodiments of the invention provide systems, methods, computer program products that provide for the maintenance and/or management of information stored in the archive(s) of an entity (e.g., a financial institution) based on one or more maintenance or management rules. Currently an entity's information archive system may not take into account the effect(s) on the management of the information in the archive based on the occurrence of events external to the archive or entity. The events external to the archive may relate to the affairs of internal clients (e.g., groups or divisions of the entity), external clients (e.g., customers of the entity), and the like. The proper management and maintenance of the information in the archive is important for several and various reasons including for saving storage space in the archive, the avoidance of purging or deleting useful information or documents required by internal or external clients based on the occurrence of certain events, and the like. An example of an occurrence or event that may affect the treatment of information stored in the archive(s) may be the initiation of litigation where, for example, the litigation relates to one or more financial documents stored in the archives of a bank. In such an example, the system would receive notification that a client has either initiated or is stated to be a party to the litigation. In most instances, the notification would trigger the bank's system to automatically extend a purge date of any information of the customer stored in the archives. Thus, the archive maintenance and management rules taking into account external and internal events that occur, such as client litigation, entity litigation, misappropriation of an account and/or account information, client loss, and the like. From a client perspective, a client/customer-defined event attributes associated with these events can be predefined in a customer account data set. Thus, present embodiments serve to create a rules-based archive maintenance system that is beneficial, in terms of storage space savings, document retention, and the like, to the customer and the entity maintaining the archive(s).

External Event Triggered Rule-Based Maintenance

Figure 1:
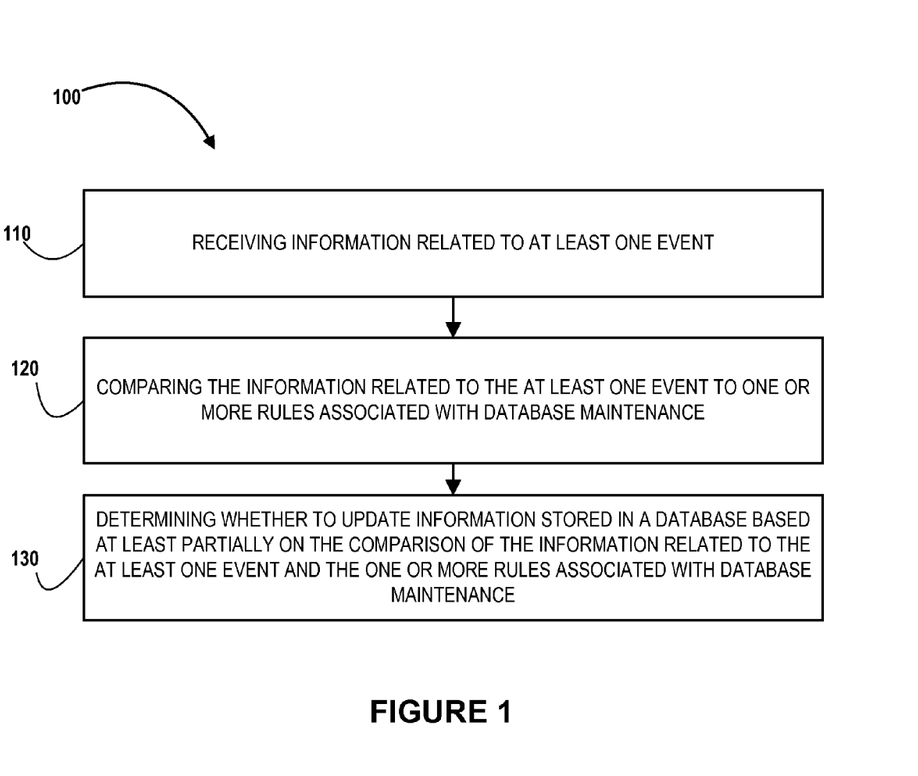
FIG. 1 illustrates a general process flow 100 for rule-based maintenance of an archive, in accordance with some embodiments of the present invention.

Referring now to FIG. 1, FIG. 1 illustrates a general process flow 100, in accordance with some embodiments of the present invention. As represented by block 110, a system executing process flow 100 receives information relating to an event. The information relating to the event may be an indication and/or a description of the event. The event may be an event that is external to the entity managing one or more archives of information. The event may be associated with a customer and/or a client of the entity managing the one or more archives of information. As an example, an event may be litigation associated with a customer of the entity, where when the system receives information relating to the litigation associated with the customer it automatically one or more rules relating to the maintenance and/or management of information stored in the archives related to the customer. In another example, the event may be an internal event and associated with the entity maintaining or managing the one or more archives of information. The event may be associated with a division of the entity managing the one or more archives of stored information. In such an example, litigation associated with the entity or some internal dispute may act as a trigger for automatically implementing one or more rules relating to the maintenance and/or management of information stored in the archives related to the entity. The information relating to an event may be received from any source. In some instances, the information relating to an event is received from a customer of an entity managing the information stored in the archives, where the customer is related to the event. The information relating to an event may also be received from an agent of the entity. Additionally, the information relating to an event may be received from some third party source and/or new feeds. In some embodiments, the entity is subscribed to the third party and/or news feed providing the information.

An "event", as sometimes referred to herein, is or relates to generally an observable occurrence that, in most cases, has some bearing or importance to some or all of information stored in an archive, where the information stored in the archive is associated with an individual or entity. More specifically, an event as discussed herein may relate to an event external to an entity maintaining an archive of information, where the information stored in the archive is relevant to a resolution of or dealing with the external event. These external events may include, but is not limited to, misappropriation of a client/customer account or information, litigation involving a customer/client of the entity, a client/customer leaving the entity and no longer being a client and/or customer of the entity, business mergers, division spinoffs, business acquisitions, business auditing, and the like. More particularly, an event may include customer events, business events, and/or global events, where each is a subset of an event but generally relate to distinct occurrences that have some bearing on the treatment of information stored in the archives. For example, a customer of a bank may enter into litigation in which the subject matter of the litigation requires the customer to divulge financial information that is relevant to the litigation. In such an instance, the event is reported to the system as a customer event such that the appropriate rules may be triggered for managing the relevant information. A global event, on the other hand, may be an occurrence that affects all or substantially all entities operating in some space, such as banking. As an example, legislation may be promulgated that changes the amount of time certain financial documents must be stored by banks. For instance, the required time for storing check images may be changed from seven years to five years. In such an instance, upon receiving notification by the system of the global event, the appropriate rules may be triggered in order to reduce the storage time of check images and save storage space. A business event may be any event that directly affects the affairs of a business or business merchant and has a bearing on the information stored in the archives. A business event such as a merger of two companies may require that a bank entity storing financial information for, at least, one of the two merging companies ensure that during the merger process financial documents for the one company is not purged or lost and such, upon notification rules may be triggered to aggregate relevant financial information from the archives and store the information in a specific file accessible to the companies. As such, it will be understood that the rules governing the archive may vary according to the type of event that occurs within the subset of events. Thus, each subset of events may have specific and distinct rules for governing the information stored in the archive(s).

As represented by block 120, the system compares the information relating to the event to one or more rules. The one or more rules, in some instances, relate to rules for managing and maintaining the information stored in an archive. More specifically, the one or more rules may relate to rules or instructions executable by the system for deleting or purging information related to the event in the archives, for placing information in the archives related to the event in a queue for purging, for removing information related to the event from a queue for purging information in the archives, for flagging information in the archives that require specific validation prior to deletion or extension, for providing a notification of information status, for extending the schedule, date, or timeline for purging and/or deleting information related to the event from the archives. As such, the one or more rules may relate to executable instructions for changing the status of some or all of the information stored in the archive relating to the event. In some embodiments, the one or more rules are based on consumer preferences or input such that the maintenance and management of the information in the archives is partially governed by the preferences of the consumer, in the case of an event, or generally for any matter. During the comparison, the system may analyze the information relating to the event in order to determine terms or data in the information related to the event that trigger the implementation of one or more of the rules and may also analyze the information relating to the event for identifying the customer or for identifying account information of the customer. Following the comparison, the system may match the information relating to the event to one or more customer accounts and may also match the information relating to the event to one or more rules that relate to the information related to the event. Based on the comparison and analysis, the system may automatically implement the rules for the management or maintenance of information in the archives of the customer and/or to any information related to the one or more accounts of the customer.

As represented by block 130, the system determines based on the comparison of the information related to the event to the one or more rules, whether or not to automatically implement the one or more rules to the archive. In some embodiments, when the system does automatically implement or apply the one or more rules to the archive, it causes the archive system to update the status of information stored in the archive determined to be associated with the event. The status of the information stored in the archive may, in some embodiments, determine or indicate how the information should be handled or treated. As an example, the rules may be applied to the information such that a new status is provided to the information that requires that a new purge date be assigned to the information, where the new purge may indicate a date and/or time that the information should be permanently removed from the archive. In another example, the rules may be applied to the information such that the status of the information is changed to require that the purge date currently assigned to the information be revised in order to reduce the purge date (i.e., Current Purge Date: Apr. 15, 2015 to Reduced Purge Date: Apr. 15, 2015), which effectively reduces the amount of time that the information is stored in the archive. Other examples for implementing the rules include, but is not limited to, updating the status of the information to place a temporary hold on the information to avoid purging, reclassifying the information into a different subject folder, and the like. It will be understood that the rules can be implemented directly to the information without having to first update a status of the information. For example, the rules may be implemented to immediately purge any information in the archives based on upon a regulation change that reduces the amount of time the information has to be maintained.

Figure 3:
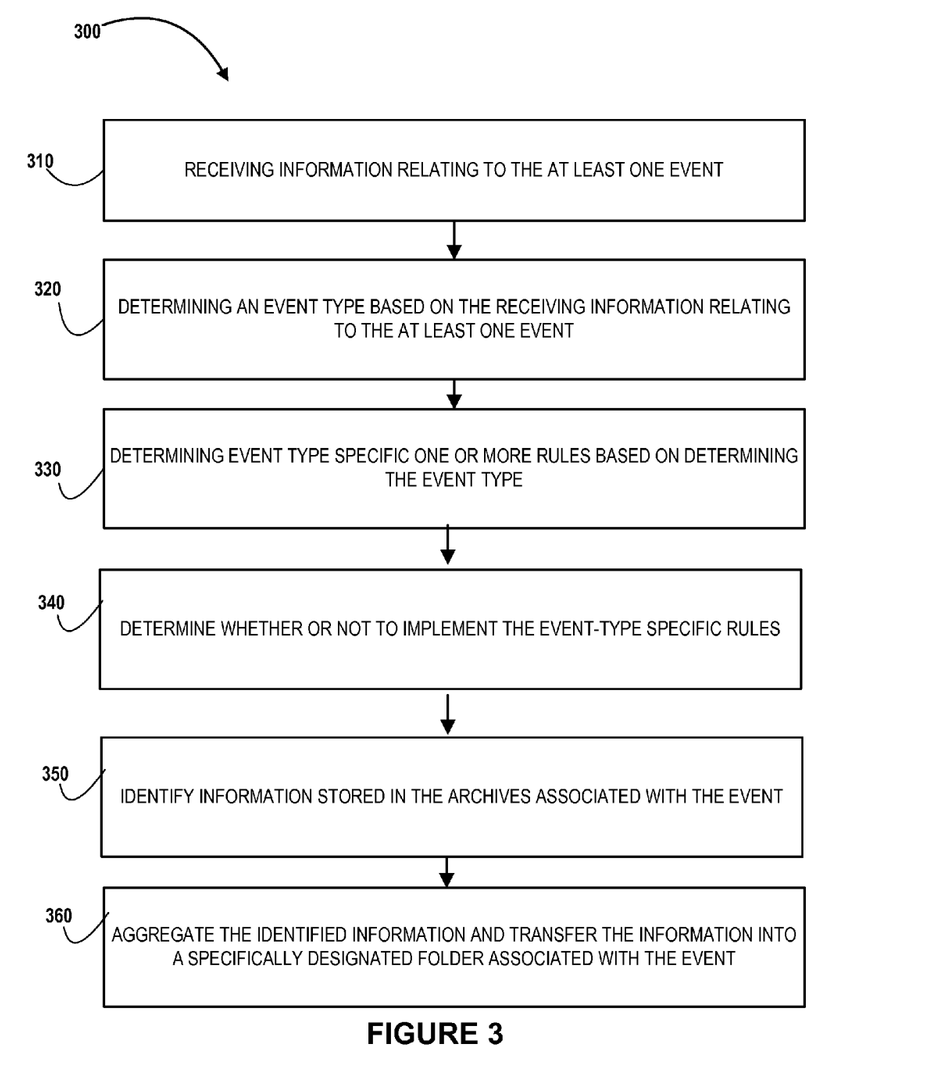
FIG. 3 illustrates a more detailed process flow 300 for rule-based maintenance of an archive, in accordance with embodiments of the present invention.

It will be understood that the system having the process flow 100 can be configured to perform any one or more portions of any embodiment described and/or contemplated herein, including for example, any one or more portions of the process flow 300 described later herein. In addition, the number, order, and/or content of the portions of the process flow 100 are exemplary and may vary. Indeed, the process flow 100, like all of the other process flows described herein, can include one or more additional and/or alternative process flow portions, and the apparatus configured to perform the process flow 100 can be configured to perform one or more additional and/or alternative functions.

Figure 2:
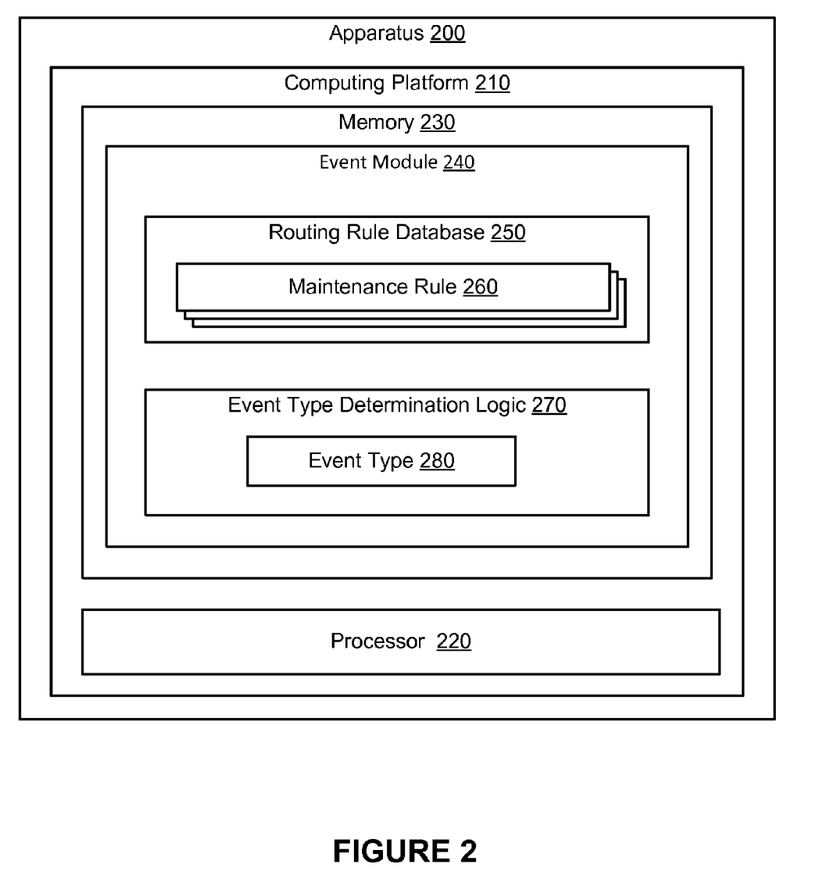
FIG. 2 is a block diagram is depicting an apparatus 200 configured to provide rules-based maintenance and management of an archive, according to embodiments of the present invention.

Referring now to FIG. 2 a block diagram is depicting an apparatus 200 configured to provide rules-based maintenance and management of an archive, according to embodiments of the present invention. Apparatus 200 may include one or multiple device. In multiple device embodiments, the devices may be networked to be in communication with one another. Apparatus 200 includes a computing platform 210 having at least one processor 220 and a memory 230.

Memory 230 of apparatus 200 includes an event module 240, otherwise referred to herein as an event hub module that is operable to receive event notifications, and process the event notification through the rules based maintenance system. It should be noted that while FIG. 2 depicts a single module, in accordance with present embodiments, event module 240 may comprises multiple modules and the multiple modules may be included within various different apparatus. Thus, the routines, applications, databases and logic described in relation to event module 240 may be included within multiple distinct modules.

The event module 240 includes archive maintenance and management rules database 250 that include one or more maintenance and management rules 260. The maintenance/management rules may be related to event processing factors such as, but not limited to, event type, importance of the event, time sensitivity of the event, whether the event is internal or external, and the like.

The event module 240 additionally includes event type determination logic 270. The logic 270 is executable by the processor 220 and is operable to determine event type (i.e., an event type 280) for an event from amongst more than one alternative event type based on the application of one or more rules and/or analysis of information related to the event. For example, the logic 270 may determine payment routing from among more than one alternative payment type, such as, but not limited to, litigation, regulation or law changes, misappropriation of an account, client loss, or the like. More than one alternative event type indicates more than one alternative event type from the aforementioned listing.

Referring now to FIG. 3, FIG. 3 illustrates a more detailed process flow 300, in accordance with some embodiments of the present invention. Process flow 300 is substantially similar to process flow 100, but with more detail. Regarding block 310, the system receives information relating to at least one event. And specifically, at block 320, the system determines an event-type based on receiving the information relating to the event. At block 330, the system determines event-type specific one or more rules based on the determination of the event type and compares the information relating to the event to the event-type specific rules. At block 340, the system determines whether or not to implement the event-type specific rules. At block 350, the system identifies the information associated with the event. At block 360, the system aggregates the identified information associated with the event, removes the information from their original storage locations, and transmits/transfers the information to a folder specifically designated for the event. The folder may identify the event and the entities associated with folder and/or event.

As represented by block 320, the system determines an event-type for the received information. An event-type may include, but is not limited to, a customer event, a business event, and a global event. Each of the previously-mentioned event types relate to distinguishable occurrences with varying implications of how information stored in the archives should be treated. For instance, a customer event may only affect the maintenance and treatment of information stored in the archive directly related to one specific customer, whereas a business event or global event may be indirectly related to customer information and more specifically, related to the general maintenance of an archive or information specifically related to the operations of a business. Determining an event-type further simplifies the processing of the information which allows the system to more quickly and efficiently implement any necessary rules for maintaining the information associated with the event.

As represented by block 330, the system determines event specific rules corresponding to the determined event-type. For each event type, there is one or more rules stored corresponding to the event-type for maintaining and/or managing information stored in the archive related to the event type. As such, once the system determines the event type, the system proceeds to compare the information related to the event to the one or more event-type specific rules. For example, the system may receive information indicating that legislation has been passed requiring that check images be stored for nine years, as opposed to seven years. In such an example, the system will determine that a change in legislation is a global event that affects any financial institution that is required to store check images and information. After, the system will then compare the information related to the event to the one or more rules and protocols specific to a global event. Following, rules for managing the archive when a global event are triggered and one or more specific actions are taken towards the information stored in the archives. The event-type specific rules vary for each type of event.

As represented by block 350, in some embodiments, the system determines information stored in the archives that is associated with the event. For example, in the case of customer litigation, the system identifies the customer, customer account information, and any information stored in the archives related to the customer and/or customer account. In such an example, the system may filter the identified information for only information relevant to the event.

At block 360, after identifying the information the system may aggregate the relevant information stored in the archives and transfer the information into one or more new files, wherein the one or more new files are specifically designated or flagged for information associated with the event. So that, for example, a customer involved in litigation/dispute may be provided with access to the aggregated information in an electronic file or folder in order to speedily resolve the litigation/dispute.

Figure 4:
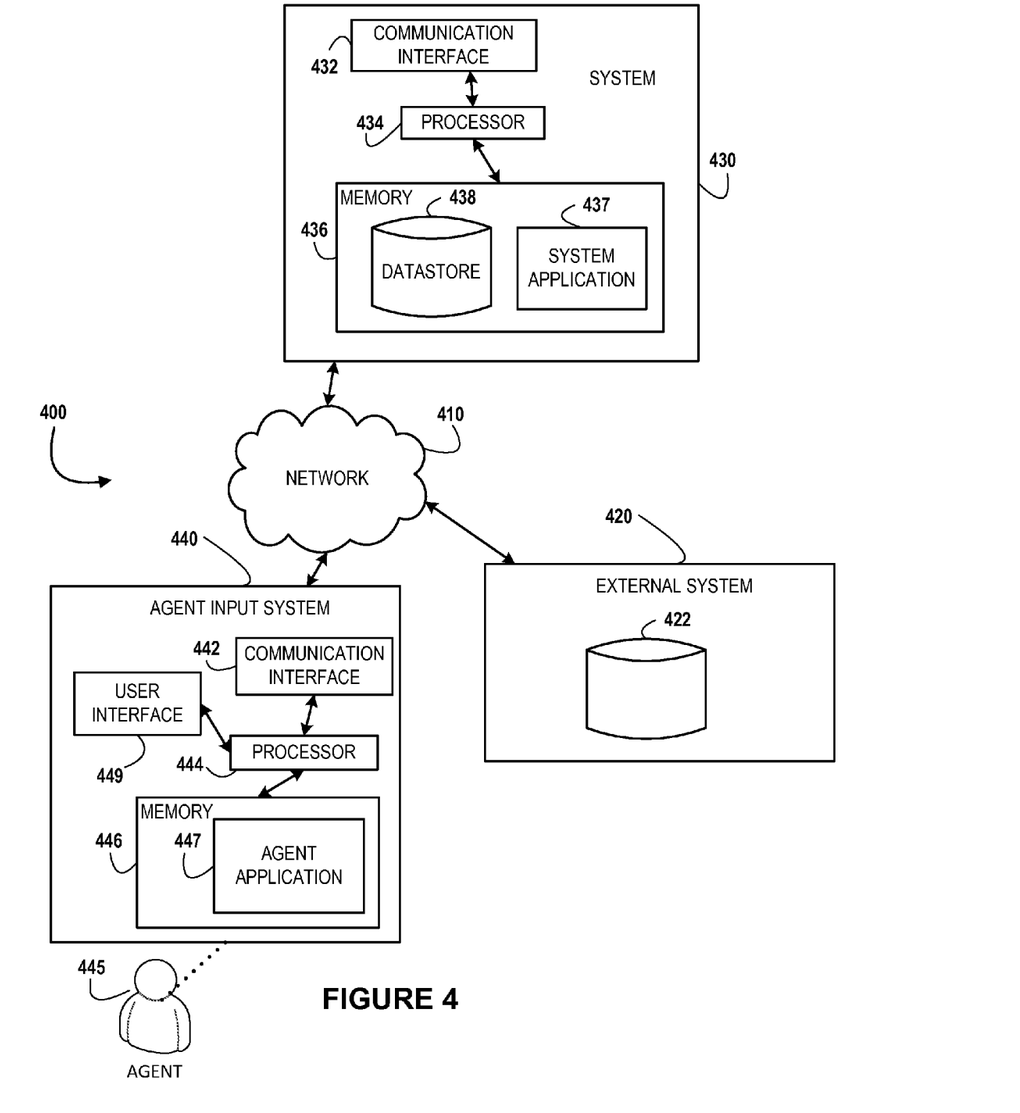
FIG. 4 is a block diagram of the system environment 400 for implementing a rule-based maintenance of an archive, in accordance with some embodiments of the present invention.

Referring now to FIG. 4, FIG. 4 presents an exemplary block diagram of the system environment 400 for implementing the process flows 100 and 300, described in FIGS. 1, and 3, in accordance with embodiments of the present invention. As illustrated, the system environment 400 includes a network 410, an external system 420, a system 430, and an agent input system 440. Also shown in FIG. 4 is an agent 445 of the agent input system 440. The agent 445 may be a person who uses the agent input system 440 to execute an agent application 447 or uses the agent input system 440 to initiate execution of a system application 437. The agent application 447 and/or the system application 437 may incorporate one or more parts of the process flows 100 and 300 and/or apparatus 200. The agent may be an employee of the entity that manages the system 430 and/or the external system 420. In other embodiments, the agent may not be an employee of an entity, but may still provide a service under the direction and/or supervision of the entity.

As shown in FIG. 4, the external system 420, the system 430, and the agent input system 440 are each operatively and selectively connected to the network 410, which may include one or more separate networks. In addition, the network 410 may include a local area network (LAN), a wide area network (WAN), and/or a global area network (GAN), such as the Internet. It will also be understood that the network 410 may be secure and/or unsecure and may also include wireless and/or wireline and/or optical interconnection technology.

The external system 420 may be any computing or non-computing system that transmits information to the system 430. Additionally or alternatively, information from the system 430 may be transmitted to the external system 420. As presented in FIG. 4, the external system 420 comprises at least one datastore 422. The datastore 422 may comprise information relating to at least one of a user, the user's financial institution account, user's information stored in the archives of the financial institution, and the like. As used herein, the terms "data" and "information" may be used interchangeably.

The agent input system 440 may include any computerized apparatus that can be configured to perform any one or more of the functions of the agent input system 440 described and/or contemplated herein. For example, the agent 445 may use the agent input system 440 to transmit and/or receive information or commands to and from the system 430. In some embodiments, for example, the agent input system 440 may include a personal computer system, a mobile computing device, a personal digital assistant, a network device, and/or the like. As illustrated in FIG. 4, in accordance with some embodiments of the present invention, the agent input system 440 includes a communication interface 442, a processor 444, a memory 446 having an agent application 447 stored therein, and an agent interface 449. In such embodiments, the communication interface 442 is operatively and selectively connected to the processor 444, which is operatively and selectively connected to the agent interface 449 and the memory 446. In some embodiments, the agent 445 may use the agent application 447 to execute processes described with respect to the process flows described herein, or may initiate the system 430 to execute the process flows described herein.

Each communication interface described herein, including the communication interface 442, generally includes hardware, and, in some instances, software, that enables the agent input system 440, to transport, send, receive, and/or otherwise communicate information to and/or from the communication interface of one or more other systems on the network 410. For example, the communication interface 442 of the agent input system 440 may include a modem, server, electrical connection, and/or other electronic device that operatively connects the agent input system 440 to another system such as the system 430.

Each processor described herein, including the processor 444, generally includes circuitry for implementing the audio, visual, and/or logic functions of the agent input system 440. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the agent application 447 of the memory 446 of the agent input system 440.

Each memory device described herein, including the memory 446 for storing the agent application 447 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 4, the memory 446 includes the agent application 447. In some embodiments, the agent application 447 includes an interface for communicating with, navigating, controlling, configuring, and/or using at least one of the system 430 or the agent input system 440. In some embodiments, the agent application 447 includes computer-executable program code portions for instructing the processor 444 to perform one or more of the functions of the agent application 447 described and/or contemplated herein. In some embodiments, the agent application 447 may include and/or use one or more network and/or system communication protocols.

Also shown in FIG. 4 is the user interface 449. In some embodiments, the user interface 449 includes one or more output devices, such as a display and/or speaker, for presenting information to the agent 445. In some embodiments, the user interface 449 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the agent 445. In some embodiments, the user interface 449 includes the input and display devices of a personal computer, such as a keyboard and monitor, which are operable to receive and display information.

FIG. 4 also illustrates a system 430, in accordance with an embodiment of the present invention. The system 430 may include any computerized apparatus that can be configured to perform any one or more of the functions of the system 430 described and/or contemplated herein. In accordance with some embodiments, for example, the system 430 may include a computer network, an engine, a platform, a server, a database system, a front end system, a back end system, a personal computer system, and/or the like. In some embodiments, such as the one illustrated in FIG. 4, the system 430 includes a communication interface 432, a processor 434, and a memory 436, which includes a system application 437 and a datastore 438 stored therein. As shown, the communication interface 432 is operatively and selectively connected to the processor 434, which is operatively and selectively connected to the memory 436.

It will be understood that the system application 437 may be configured to implement any one or more portions of the various user interfaces and/or process flows described herein. It will also be understood that, in some embodiments, the memory includes other applications. It will also be understood that, in some embodiments, the system application 437 is configured to communicate with the datastore 438, the agent input system 440 and/or the external system 420.

It will be further understood that, in some embodiments, the system application 437 includes computer-executable program code portions for instructing the processor 434 to perform any one or more of the functions of the system application 437 described and/or contemplated herein. In some embodiments, the system application 437 may include and/or use one or more network and/or system communication protocols.

In addition to the system application 437, the memory 436 also includes the datastore 438. As used herein, the datastore 438 may be one or more distinct and/or remote datastores. In some embodiments, the datastore 438 is not located within the system and is instead located remotely from the system. In some embodiments, the datastore 438 stores information or data described herein. For example, the datastore 438 may store information relating to at least one of the user, the user's financial institution account, preferences of the user for managing information related to the account, rules related to the maintenance and management of the information related to the user's financial institution account and more, and the like.

It will be understood that the datastore 438 may include any one or more storage devices, including, but not limited to, archives, datastores, databases, and/or any of the other storage devices typically associated with a computer system. It will also be understood that the datastore 438 may store information in any known way, such as, for example, by using one or more computer codes and/or languages, alphanumeric character strings, data sets, figures, tables, charts, links, documents, and/or the like. Further, in some embodiments, the datastore 438 may include information associated with one or more applications, such as, for example, the system application 437. It will also be understood that, in some embodiments, the datastore 438 provides a substantially real-time representation of the information stored therein, so that, for example, when the processor 434 accesses the datastore 438, the information stored therein is current or substantially current.

It will be understood that the embodiment of the system environment illustrated in FIG. 4 is exemplary and that other embodiments may vary. As another example, in some embodiments, the system 430 includes more, less, or different components. As another example, in some embodiments, some or all of the portions of the system environment 400 may be combined into a single portion. Likewise, in some embodiments, some or all of the portions of the system 430 may be separated into two or more distinct portions.

In addition, the various portions of the system environment 400 may be maintained for and/or by the same or separate parties. For example, the system 430 and the external system 420 may be maintained by separate parties.

It will also be understood that the system 430 may include and/or implement any embodiment of the present invention described and/or contemplated herein. For example, in some embodiments, the system 430 is configured to implement any one or more of the embodiments of the process flow 100 and 300 described and/or contemplated herein in connection with FIGS. 1, 2, and 3, or any other process flow described herein.

As will be appreciated by one skilled in the art, aspects of the present embodiments of the invention may be embodied as a system, method, or computer program product. Accordingly, aspects of the present invention may take the form of an entirely hardware embodiment, an entirely software embodiment (including firmware, resident software, microcode, and the like) or an embodiment combining software and hardware aspects that may all generally be referred to herein as a "circuit," "module" or "system." Furthermore, aspects of the present embodiments of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, and the like, or any suitable combination of the foregoing. Computer program code for carrying out operations for aspects of the present embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the invention are described below with reference to flowchart illustrations and/or block diagrams of methods, apparatus (systems) and computer program products according to embodiments of the embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for providing rule-based maintenance of an archive, the system comprising:
   a computing platform including at least one processor and a storage device;
   a database comprising one or more rules relating to maintenance of information stored in the archive;
   a software module stored in the storage device, comprising executable instructions executed by the processor cause the processor to:
   receive information related to at least one event;
   determine, from one or more rules, one or more event specific rules relating to maintenance of information stored in the archive for the at least one event based on determining an event-type for the received information related to the at least one event, wherein the one or more event specific rules are management and maintenance rules for scheduling of storage duration and purging of the information related to the at least one event implemented upon determination of the event-type of the at least one event, and wherein the event-type is a customer event, a business event, or a global event;

compare the information related to the at least one event to the one or more event specific rules and trigger implementation of the one or more event specific;

identify at least one customer account associated with the at least one event;

update information stored in the archive related to the at least one customer account associated with the at least one event based on the comparison of the information related to the at least one event, the one or more event specific rules, and triggering of the one or more event specific rules, wherein the information stored in the archive comprises personal and financial documents and data;

update personal and financial documents and data not initially identified as being associated with the at least one event stored in the archive associated with the customer according to the one or more event specific rules based on matching to the at least one customer account;

extract information stored in the archive, wherein the information is associated with the at least one customer account associated with the at least one event;

aggregate the information stored in the archive, wherein the information is associated with the at least one customer account associated with the at least one event and the personal and financial documents and data not initially identified as being associated with the at least one event; and transmit the aggregated information into one or more new files, wherein the one or more new files are specifically designated for the aggregated information associated with the at least one event.

2. The system of claim 1, wherein the information related to the at least one event relates to an occurrence of an event external to an entity maintaining the archive, and wherein the event external to the entity is associated with a customer of the entity.

3. The system of claim 2, wherein the information related to the at least one event relates to an occurrence of an event internal to the entity maintaining the archive, and where the event internal to the entity is associated with a division of the entity.

4. The system of claim 1, wherein the information related to the at least one event relates to an initiation or an occurrence of litigation, wherein the initiation or the occurrence of litigation involves the customer of an entity.

5. The system of claim 1, wherein the information related to the at least one event relates to a change in regulations governing a time requirement for storing financial information in the archive for a plurality of customers of a financial institution.

6. The system of claim 1, the software module further comprises executable instructions executed by the processor cause the processor to:

automatically update a status corresponding to information in the archive, wherein the update changes a prior date for purging the information from the archive to a new date for purging the information from the archive, placing a temporary hold on purging of the information, or immediately purges the information.

7. A computer program product for providing rule-based maintenance of an archive, the computer program product comprising a non-transitory computer-readable storage medium having computer-readable program code stored thereon, the computer-readable program code is executed by a computer processor causes the computer to:

receive information related to at least one event;

determine, from one or more rules, one or more event specific rules relating to maintenance of information stored in the archive for the at least one event based on determining an event-type for the received information related to the at least one event, wherein the one or more event specific rules are management and maintenance rules for scheduling of storage duration and purging of the information related to the at least one event implemented upon determination of the event-type of the at least one event, and wherein the event-type is a customer event, a business event, or a global event;

compare the information related to the at least one event to the one or more event specific rules and trigger implementation of the one or more event specific rules;

identify at least one customer account associated with the at least one event;

update information stored in the archive related to the at least one customer account associated with the at least one event based on the comparison of the information related to the at least one event, the one or more event specific rules, and triggering of the one or more event specific rules, wherein the information stored in the archive comprises personal and financial documents and data;

update personal and financial documents and data not initially identified as being associated with the at least one event stored in the archive associated with the customer according to the one or more event specific rules based on matching to the at least one customer account;

extract information stored in the archive, wherein the information is associated with the at least one customer account associated with the at least one event;

aggregate the information stored in the archive, wherein the information is associated with the at least one customer account associated with the at least one event and the personal and financial documents and data not initially identified as being associated with the at least one event; and transmit the aggregated information into one or more new files, wherein the one or more new files are specifically designated for the aggregated information associated with the at least one event.

8. The computer program product of claim 7, wherein the information related to the at least one event relates to an occurrence of an event external to an entity maintaining the archive, and wherein the event external to the entity is associated with a customer of the entity.

9. The computer program product of claim 8, wherein the information related to the at least one event relates to an occurrence of an event internal to the entity maintaining the archive, and where the event internal to the entity is associated with a division of the entity.

10. The computer program product of claim 7, wherein the information related to the at least one event relates to an initiation or an occurrence of litigation, wherein the initiation or the occurrence of litigation involves the customer of an entity.

11. The computer program product of claim 7, wherein the information related to the at least one event relates to a change in regulations governing a time requirement for storing financial information in the archive for a plurality of customers of a financial institution.

12. The computer program product of claim 7, further comprising computer-readable program code executed by a computer processor causes the computer to:
automatically update a status corresponding to information in the archive, wherein the update changes a prior date for purging the information from the archive to a new date for purging the information from the archive, placing a temporary hold on purging of the information, or immediately purges the information.

13. A computer-implemented method for providing rule-based maintenance of an archive, the computer-implemented method comprising:
using a computer processor comprising computer program code instructions stored in a non-transitory computer readable medium, wherein said computer program code instructions are structured to cause said computer processor to:
receive information related to at least one event;
determine, from one or more rules, one or more event specific rules relating to maintenance of information stored in the archive for the at least one event based on determining an event-type for the received information related to the at least one event, wherein the one or more event specific rules are management and maintenance rules for scheduling of storage duration and purging of the information related to the at least one event implemented upon determination of the event-type of the at least one event, and wherein the event-type is a customer event, a business event, or a global event;
compare the information related to the at least one event to the one or more event specific rules and trigger implementation of the one or more event specific;
identify at least one customer account associated with the at least one event;
update information stored in the archive related to the at least one customer account associated with the at least one event based on the comparison of the information related to the at least one event, the one or more event specific rules, and triggering of the one or more event specific rules, wherein the information stored in the archive comprises personal and financial documents and data;
update personal and financial documents and data not initially identified as being associated with the at least one event stored in the archive associated with the customer according to the one or more event specific rules based on matching to the at least one customer account;
extract information stored in the archive, wherein the information is associated with the at least one customer account associated with the at least one event and the any information;
aggregate the information stored in the archive, wherein the information is associated with the at least one customer account associated with the at least one event and the personal and financial documents and data not initially identified as being associated with the at least one event; and
transmit the aggregated information into one or more new files, wherein the one or more new files are specifically designated for the aggregated information associated with the at least one event.

14. The computer-implemented method of claim 13, wherein the information related to the at least one event relates to an occurrence of an event external to an entity maintaining the archive, and wherein the event external to the entity is associated with a customer of the entity.

15. The computer-implemented method of claim 14, wherein the information related to the at least one event relates to an occurrence of an event internal to the entity maintaining the archive, and where the event internal to the entity is associated with a division of the entity.

16. The computer-implemented method of claim 13, wherein the information related to the at least one event relates to an initiation or an occurrence of litigation, wherein the initiation or the occurrence of litigation involves the customer of an entity.

17. The computer-implemented method of claim 13, wherein the information related to the at least one event relates to a change in regulations governing a time requirement for storing financial information in the archive for a plurality of customers of a financial institution.

18. The computer-implemented method of claim 13, further comprises computer program code instructions are structured to cause said computer processor to:
automatically update a status corresponding to information in the archive, wherein the update changes a prior date for purging the information from the archive to a new date for purging the information from the archive, placing a temporary hold on purging of the information, or immediately purges the information.

* * * * *